Jan. 13, 1959        C. B. PEAK        2,867,959
HITCH DEVICE FOR TRAILING BREAK-BACK MOWER
Filed June 13, 1955
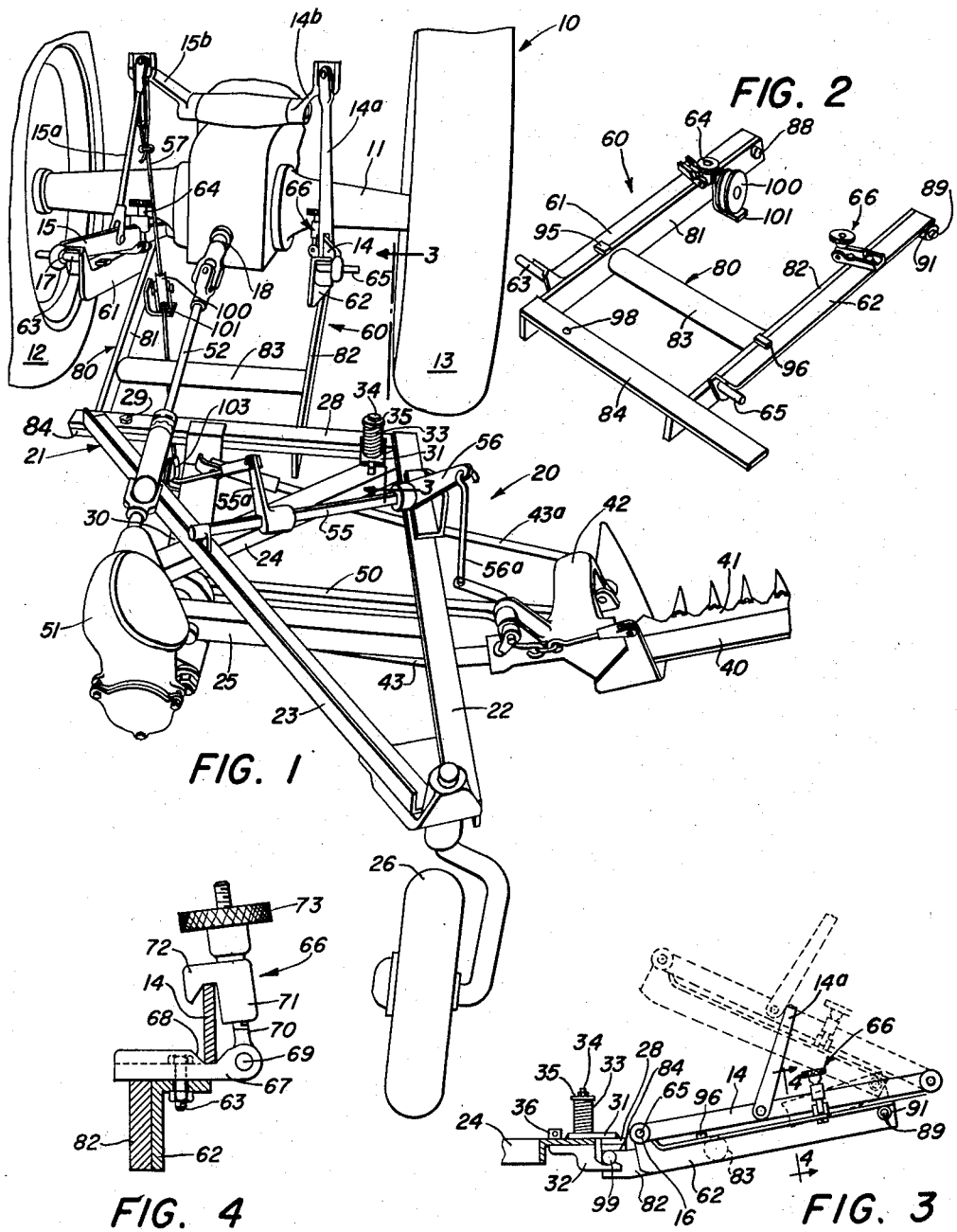
INVENTOR.
CHARLES B. PEAK

United States Patent Office 2,867,959
Patented Jan. 13, 1959

2,867,959

HITCH DEVICE FOR TRAILING BREAK-BACK MOWER

Charles B. Peak, Geneseo, Ill., assignor, by mesne assignments, to Deere & Company, a corporation of Delaware Application June 13, 1955, Serial No. 515,133

10 Claims. (Cl. 56—25)

The present invention relates generally to a hitch device for coupling a farm implement of the trailing type to a mobile pulling implement such as a tractor. More particularly, it refers to a hitch device for coupling a trailing break-back mower to a power-lift equipped tractor of the type having a pair of laterally spaced, rearwardly extending draft links that are laterally swingable about tractor-carried joints at their forward ends.

In this latter type of tractor the draft links are normally attached to the tractor to permit relatively free lateral and vertical swinging about their forward ends. Lateral stability of the links is usually created by providing a rigid connection between the links either by the hitch device or by the implement itself. Vertical stability of the links is normally created by connecting each of the links to the power lift on the tractor. However, on many farm implements there are operative parts which are dependent upon the power lift means for operation or to move a part on the implement. Where this situation exists, the draft links are normally disconnected from the power lift means in order that the implement will not be raised when the part is operated.

An implement of this type is a common variety of mower which is positioned in a trail-behind relationship to the tractor and as such is connected to the draft links. The cutter bar on the mower is normally raised or lowered through a mechanism which is operative to raise or lower the cutter bar in response to movement of a cable directly connected to the power lift on the tractor. The draft links are usually disconnected from the power lift on the tractor in order that the cutter bar may be raised or lowered in response to movement of the power lift without also causing a corresponding raising or lowering of the implement as a whole.

This latter condition creates a situation in which there is no vertical stabilizing action on the draft links by the power lift and consequently they are permitted to freely move relative to one another. Inasmuch as the cutter bar extends transversely to one side of the tractor, obviously the weight of the mower is to that side and unless in some manner restricted or compensated for the cutter bar will be inclined at an angle to the ground thereby causing in many instances an uneven cut. Likewise this type of hitch device does not provide for a rigid connection between the tractor and implement and therefore permits considerable vibrations to be set up in the implement which ultimately adversely affects the life of the implement as well as the necessary maintenance time.

It is, therefore, the primary object of this invention to provide a hitch device which is mounted on the draft links on the tractor and permits the links to be connected to the power lift arms in order to maintain vertical stability of the draft links and is further characterized by being substantially ineffective to raise or lower the implement in response to adjustment of the power lift arms.

It is also an object of this invention to provide a hitch device that is readily removable from and attachable to both the tractor and the mower and can easily be removed from one of the units without disassembling from the other.

Another object is to provide a hitch device that will rigidly interconnect the draft links so as to restrict lateral swinging of the links while attached to the hitch device.

Still a further object of this invention is to provide pulley means mounted on and as part of the hitch device that serves to redirect a power relay cable extending from the power lift on the tractor to the lift mechanism on the mower around obstructions on the hitch device and the mower.

Other objects and advantages of the invention will become readily apparent to one skilled in the art as the details of this device are described in conjunction with the accompanying drawings in which Fig. 1 is a perspective view taken from the rear and showing parts of the tractor, mower and hitch device.

Fig. 2 is a rear and side perspective of the hitch device.

Fig. 3 is a right side sectional view of the hitch device, a draft link, and the latch on the mower and taken along line 3—3 of Fig. 1. The position of the hitch device in Fig. 1 is represented in dotted representation in Fig. 3.

Fig. 4 is an enlarged sectional view taken along line 4—4 of Fig. 3.

For clarity of description the left and right portions and parts shall be referred to in the description as viewed from the rear of the assembly and looking forwardly or more specifically as shown in Figs. 1 and 2. Likewise, front and rear directions shall be determined by designating the forward portions of the tractor as being the front of the assembly and the mower as being on the rear of the tractor.

Referring now to the drawings, the tractor is indicated in its entirety by the reference numeral 10 and is of a conventional type having, as shown in Fig. 1, a laterally extending rear axle housing 11 carried on left and right hand traction wheels 12 and 13, respectively. The tractor is provided with two laterally spaced rearwardly extending draft links 14 and 15 connected at their forward ends for substantially free lateral and vertical swinging within limits. The draft links 14 and 15 are connected to power lift arms 14b and 15b by lift links 14a and 15a. The draft links 14 and 15 are provided at their rear ends with transversely aligned apertures 16 and 17. A power take-off shaft 18 extends rearwardly from the axle housing 11.

The mower is indicated in its entirety by the reference numeral 20. A main frame 21 comprises a pair of angle iron members 22 and 23 which are suitably spaced apart at their forward ends and converge rearwardly, their rear ends being fixed to a caster wheel support member which receives the vertical spindle of a caster wheel 26. The frame members 22 and 23 are connected together by means of a front end portion or transverse bar 28, a diagonal brace bar 24, and a rear transverse bar 25, forming a rigid mower frame. A hole is cut through the left side of the transverse bar 28, for receiving a vertically disposed pivot bolt 29. On the opposite or right side of the mower frame is a releasable latch mechanism comprising a cross piece 31 extending between and fixed to frame members 24, 28 and a latch member 32 disposed beneath the cross piece 31 and adapted to engage a complementary latch receiving member 99 fixed to the hitch device and which will be explained in detail later. The latch member 32 is pivoted at 36 and is yieldably supported by means of a spring 33 disposed on top of the cross piece 31 and embracing a bolt 34 which extends vertically through suitable openings in the cross piece 31 and latch member 32. The upper end of the spring bears against a retaining washer 35 carried by the bolt 34 and the lower end of the spring bears against the cross piece 31. The latch may be of any type. That shown here is similar to the latch in the U. S. patent to Coultas 2,225,156.

A cutter bar or part of the mower indicated at 40, supports a reciprocating sickle 41 and is supported in turn on a shoe arch 42. The arch 42 is connected to the mower frame by a conventional drag bar 43 and rod or brace 43a. The sickle 41 is slidably supported on the cutter bar 40 for reciprocating motion and is operated by a pitman 50 with which it is pivotally connected at one end. The other end of the pitman 50 is journaled on a crankshaft, not shown, which is journaled in and extends forwardly of a drive housing 51. The drive housing 51 is mounted on the frame members 24 and 25 and encloses suitable power transmitting means including a forwardly extending driving shaft 52 for rotating the above mentioned crankshaft and thereby driving the pitman 50. The driving shaft 52 is conventionally driven from the power take-off shaft 18 on the tractor through articulate connections thereto, which details are not unlike those in the U. S. patent to Coultas 1,946,541.

The cutter bar or part 40 is raised or lowered relative to the mower frame 21 by a lift mechanism on the mower that is actuated by the power lift on the tractor represented by a power lift cable 57. The lift mechanism on the mower comprises basically a square section rockshaft member 55 having fixed thereon a rearwardly extending lift member 56 that has a rear end connected to a vertically extending link 56a that is also connected to the vertically adjustable cutter bar. Also rigid on the rockshaft 55 and extending upwardly therefrom is a lever arm 55a that has at its free end suitable receiving means which is connected to the power lift cable 57 which as previously mentioned is controlled by the power lift arm 15b on the tractor, such as in the U. S. patent to Colvin 2,622,383.

The hitch device connecting the mower to the tractor is indicated in its entirety by the reference numeral 60 and comprises a pair of longitudinally extending arms 61 and 62 having L-shaped cross sections and adaptable to be mounted on each of the respective draft links 14 and 15, respectively. The left arm 61 is mounted on the left draft link 15 by means of an outwardly and transversely extending pin 63 fixed to the rear end of the arm 61 and projecting through the aperture 17 in the link 15. The forward end of the arm 61 is mounted on the draft link 15 by means of a releasable clamp 64 which is fixed to the upper surface of the arm 61. Likewise, the right arm 62 is mounted on the right draft link 14 by means of a transversely and outwardly extending pin 65 which passes through the aperture 16 at the rear end of the draft link 14 and the releasable clamp 66 which is fixed to the forward end of the arm 62 and which engages the forward portion of the draft link 14. Details of the clamp used are shown in Fig. 4. The right clamp 66 will be explained in detail although it should be understood that the left clamp 64 and right clamp 66 are similar. The clamp 66 comprises a laterally extending rigid portion 67 which is fixed adjacent to the upper surface of the L-shaped arm 62 by means of a bolt and nut combination 63. The portion 67 has a suitable notch 68 cut in its upper surface for receiving the lower edge of the draft link 14. Pivotally mounted on the outer end of the member 67 by means of a pivot pin 69 is a threaded member 70 which is free, unless otherwise restricted, to swing in a vertical arc transverse to the direction of travel. Mounted on the threaded member 70 for axial movement relative thereto is an upper clamping member 71 which has a hooked portion 72 adapted to overlap and engage the upper edge of the link 14. Also mounted on the threaded member 70 is an adjustable nut 73 having an integral flange portion which engages a surface of the clamping member 71 for effecting axial movement of the member 71 upon adjustment of the nut 73 along the member 70.

Also provided as part of the hitch device is a rigid framework 80 comprising a pair of longitudinally extending and rigid elongated members 81 and 82 which are positionable to lie adjacent to and inwardly of the respective transversely spaced arms 61 and 62. The elongated members 81 and 82 are interconnected and rigidly fixed to one another by laterally extending braces which include a transverse tubular member 83 fixed to midportions of the respective members and a transverse bar 84 mounted on the upper edges and at the rear end of the members.

The framework 80 is connected to the longitudinally extending arms 61 and 62 by means of laterally extending pins 88 and 89 which are fixed to the upright portions of the elongated members 81 and 82 and extend laterally outwardly and are received in short tubular members, as at 91, which are fixed to the forward ends of the arms 61 and 62 by welding or other suitable means. The pins 88 and 89 in conjunction with the tubular members 91 serve as pivotal means connecting the framework 80 to the arms 61 and 62 and permit relative vertical movement between the framework and arms. The arms 61, 62 and the parts thereon obviously therefore serve as connecting means between the links 14, 15 and the framework 80. For reasons that will become apparent, the framework 80 is therefore operative to swing vertically about an axis proximate to the forward ends of the links 14, 15. Stop brackets 95 and 96 are fixed also by welding to the upper surface of the arms 61 and 62 and extend inwardly to engage the upper edge of the elongated members 81 and 82 thereby serving as one-way stop means for limiting downward swinging of the arms 61 and 62 relative to the members 81 and 82.

The laterally extending bar 84 that connects the arms 81 and 82 has a hole 98 in one end thereof that receives the pivot bolt 29. Thus, the pivot bolt 29 and the hole 98 serve as pivot means to establish an axis for breakback swinging of the mower. On the opposite or right end of the transverse hitch bar 84 is a complementary latch member 99 in the form of a short stub fixed to the underside of the bar 84. The complementary latch member 99 is positioned to cooperate with the latch 32 on the mower.

Also as part of the hitch device is a pulley 100 which is mounted on a pulley bracket 101 fixed in a suitable manner to the left elongated member 81. Mounted on the implement is a cooperating pulley 103 which cooperates with the aforesaid pulley 100 to thread and redirect the power lift cable 57 so as to relay power from the power lift arm 58 on the tractor to the rockshaft 55.

The hitch device operates in the following manner. It is connected to the draft links 14 and 15 by first extending the laterally extending pins 63 and 65 through the respective apertures 16 and 17 in the arms in the links 14 and 15. The forward end of the arms 61 and 62 are releasably secured to the links 14 and 15 by means of the clamps 64 and 66 which may be easily attached or detached from the links by tightening or loosening the adjusting nuts on the respective clamps. The hitch device is connected to the implement by passing the pivot bolt 29 through the hole 98 in the crossbar 84 and engaging the latch 32 with the stud bar 99 on the underside of the crossbar.

In operation should it be desired to raise the cutter bar 40 it may be done by raising the lift arms 14b, 15b, thereby transmitting power through the cables 57 and the lifting mechanism on the implement. When the lift arms 14b, 15b are raised, a corresponding raising of the draft links 14 and 15 will also occur. However, when in the raised position, the hitch device will scissor about the forward pivot pins 88 and 89 as shown in Fig. 1 and in dotted representation in Fig. 3. Inasmuch as the forward end of the arms 61 and 62 are positioned proximate to the forward connection of the draft links 14 and 15 to the tractor, the vertical displacement of the pivot pins 88 and 89 will be relatively small upon a substantially large angular displacement of the draft links. Thus, raising or lowering of the cutter bar 40 will have little effect in raising or lowering the implement. However, the lift links 14a and 15a will operate with the lift arms 14b and 15b to serve to stabilize the links 14 and 15 against vertical swinging. Thus, is provided a hitch device in which the power lift means on the tractor may be utilized to both lift the cutter bar on the mower as well as maintain a stabilized condition in the implement.

It should be recognized that other forms and variations of the present invention could exist without departing basically from the broad general principles herein claimed. It should therefore be understood that while the preferred embodiment of the invention has been described with the view of clearly and concisely illustrating the invention, it is desired not to so limit or narrow the invention beyond that which is claimed.

What is claimed is:

1. A hitch device for coupling a break-back mower to a power-lift-equipped tractor having a pair of transversely spaced and rearwardly extending draft links freely swingable laterally within limits about their forward ends and operative to swing vertically in response to vertical adjustment of power lift means mounted on the tractor, and wherein the mower has a frame provided with a vertical pivot at one side of a front end portion and with a releasable latch at the opposite side of the front end portion and a cutter bar operative to be raised or lowered in response to vertical adjustment of the power lift means mounted on the tractor; said hitch device comprising: a pair of longitudinally extending arms adaptable to be mounted on each of the respective draft links to cause their front end portions to be positioned proximate to the forward ends of the draft links whereby vertical movement of the draft links will result in a relatively small displacement of the front end portions; a pair of longitudinally extending and rigid elongated members positionable to lie adjacent to the aforesaid arms and rigidly fixed to one another by laterally extending framework including a laterally extending bar fixed to the members and having pivot means thereon adjacent to one end thereof for receiving the mower pivot to establish an axis for backbreak swinging of the mower; latch receiving means mounted on the bar and adjacent to the other end thereof for connection to the releasable latch on the mower; and means connecting the forward ends of the elongated members to forward portions of the arms permitting relative vertical swinging between the members and the arms.

2. A hitch device for coupling a mower to a power-lift-equipped tractor having a pair of transversely spaced and rearwardly extending draft links freely swingable laterally within limits about their forward ends and operative to swing vertically in response to vertical adjustment of power lift means mounted on the tractor and wherein the mower has a cutter bar operative to be raised or lowered in response to vertical adjustment of the power lift means; said hitch device comprising: a pair of longitudinally extending arms adaptable to be mounted on each of the respective draft links to cause their front end portions to be positioned proximate to the forward ends of the draft links whereby vertical movement of the draft links will result in a relatively small displacement of the front end portions; a pair of longitudinally extending and rigid elongated members positionable to lie adjacent to the aforesaid arms and rigidly fixed to one another by laterally extending framework; means mounted on the members adaptable for connection to the mower; and means connecting the forward ends of the elongated members to forward portions of the arms permitting relative vertical swinging between the members and the arms.

3. A hitch device for coupling a mower to a power-lift-equipped tractor having a pair of transversely spaced and rearwardly extending draft links freely swingable laterally within limits about their forward ends and operative to swing vertically in response to vertical adjustment of power lift means mounted on the tractor comprising: a pair of longitudinally extending arms adaptable to be mounted on each of the respective draft links to cause their front end portions to be positioned proximate to the forward ends of the draft links whereby vertical movement of the draft links will result in a relatively small displacement of the front end portions; a pair of longitudinally extending and rigid elongated members positionable to lie adjacent to the aforesaid arms and rigidly fixed to one another by laterally extending framework; means mounted on the members adaptable for connection to the mower; means connecting the forward ends of the elongated members to forward portions of the arms permitting relative vertical swinging between the members and the arms; and one-way stop means fixed to the arms and engageable with the elongated members to limit downward movement of the arms relative to the elongated members.

4. A hitch device for coupling a trail behind implement to a power-lift-equipped tractor having a pair of transversely spaced and rearwardly extending draft links freely swingable laterally within limits about their forward ends and operative to swing vertically in response to vertical adjustment of power lift means mounted on the tractor, and wherein the implement has a part thereon operative in response to vertical adjustment of the power lift means; said hitch device comprising: a pair of longitudinally extending arms adaptable to be mounted on each of the respective draft links to cause their front end portions to be positioned proximate to the forward ends of the draft links whereby vertical movement of the draft links will result in a relatively small displacement of the front end portions, a pair of longitudinally extending and rigid elongated members positionable to lie adjacent to the aforesaid arms and rigidly fixed to one another by laterally extending framework; means on the framework adaptable for connection to the implement; and means connecting the forward ends of the elongated members to forward portions of the arms permitting relative vertical swinging between the members and the arms.

5. A hitch device for coupling a trail behind implement to a power-lift-equipped tractor having a pair of transversely spaced and rearwardly extending draft links freely swingable laterally within limits about their forward ends and operative to swing vertically in response to vertical adjustment of power lift means mounted on the tractor, and wherein the implement has a part thereon operative in response to vertical adjustment of the power lift means; said hitch device comprising: a pair of longitudinally extending arms adaptable to be mounted on each of the respective draft links to cause their front end portions to be positioned proximate to the forward ends of the draft links whereby vertical movement of the draft links will result in a relatively small displacement of the front end portions, a laterally disposed rigid framework having front and rear ends; means on the rear end of the framework adaptable for connection to the implement; and means connecting the front end of the framework to forward portions of the arms permitting relative vertical swinging between the framework and the arms.

6. A hitch device for coupling a trail behind implement to a power-lift-equipped tractor having a pair of transversely spaced and rearwardly extending draft links freely swingable laterally within limits about their forward ends and operative to swing vertically in response to vertical adjustment of power lift means mounted on the tractor, comprising: longitudinally extending arm means adaptable to be mounted on the draft links to cause a front end portion thereof to be positioned proximate to the forward ends of the draft links whereby vertical movement of the draft links will result in a relatively small displacement of the front end portion; a laterally disposed rigid framework having front and rear ends; means on the rear end of the framework adaptable for connection to the implement; and means connecting the front end of the framework to forward portions of the arm means permitting relative vertical swinging between the framework and the arm means.

7. A hitch device for coupling a break-back mower to a power-lift-equipped tractor having a pair of transversely spaced and rearwardly extending draft links freely swingable laterally within limits about their forward ends and operative to swing vertically in response to vertical adjustment of power lift means mounted on the tractor, and wherein the mower has a frame provided with a vertical pivot at a front end portion thereof and with a releasable latch laterally spaced from the pivot and further including a rockable lift member connected to a vertically adjustable mower part, said rockable member being actuated by a cable extending from the power lift to the member; said hitch device comprising; a pair of longitudinally extending arms adaptable to be mounted on each of the respective draft links to cause their front end portions to be positioned proximate to the forward ends of the draft links whereby vertical movement of the draft links will result in a relatively small displacement of the front end portions; a pair of longitudinally extending and rigid elongated members positionable to lie adjacent to one of the aforesaid arms and rigidly fixed to one another by laterally extending framework including a laterally extending bar fixed to the members and having pivot means thereon for receiving the mower pivot to establish an axis for back-break swinging of the mower; latch receiving means mounted on the bar for connection to the releasable latch on the mower; means connecting the forward ends of the elongated members to forward portions of the arms permitting relative vertical swinging between the members and the arms; and pulley means mounted on one of the members for directing the cable from the mower to the power lift means.

8. A hitch device for coupling a break-back mower to a power-lift-equipped tractor having a pair of transversely spaced and rearwardly extending draft links freely swingable laterally within limits about their forward ends and operative to swing vertically in response to vertical adjustment of power lift means mounted on the tractor, and wherein the mower has a frame provided with a vertical pivot and a releasable latch laterally spaced from the pivot and further including a rockable lift member connected to a vertically adjustable mower part, said rockable member being actuated by a cable extending from the power lift to the member; said hitch device comprising; a pair of longitudinally extending arms adaptable to be mounted on each of the respective draft links to cause their front end portions to be positioned proximate to the forward ends of the draft links whereby vertical movement of the draft links will result in a relatively small displacement of the front end portions; a laterally disposed rigid framework having front and rear ends and pivot means thereon for receiving the mower pivot to establish an axis for back-break swinging of the mower; latch receiving means mounted on the framework for connection to the releasable latch on the mower; means connecting the front end of the framework to forward portions of the arms permitting relative vertical swinging between the framework and the arms; and pulley means mounted on one of the members for directing the cable from the mower to the power lift means.

9. The invention defined in claim 8 further characterized by one-way stop means mounted on the arms and engageable with the framework to limit downward movement of the arms relative to the framework.

10. A hitch device for coupling a trail behind implement to a power-lift-equipped tractor having a pair of transversely spaced and rearwardly extending draft links operative to swing vertically in response to vertical adjustment of power lift means mounted on the tractor, and wherein the implement has a part thereon operative in response to vertical adjustment of the power lift means; said hitch device comprising: a pair of longitudinally extending arms adaptable to be mounted on each of the respective draft links to cause their front end portions to be positioned proximate to the forward ends of the draft links whereby vertical movement of the draft links will result in a relatively small displacement of the front end portions, a laterally disposed framework having front and rear ends; means on the rear end of the framework adaptable for connection to the implement; and means connecting the front end of the framework to forward portions of the arms permitting relative vertical swinging between the framework and the arms.

References Cited in the file of this patent

UNITED STATES PATENTS

| 2,225,156 | Coultas | Dec. 17, 1940 |
| 2,430,696 | Acton | Nov. 11, 1947 |
| 2,544,181 | Richey | Mar. 6, 1951 |
| 2,710,569 | Altgelt | June 14, 1955 |
| 2,739,436 | Dort et al. | Mar. 27, 1956 |
| 2,782,704 | Jackson | Feb. 26, 1957 |